(12) United States Patent
Chandra et al.

(10) Patent No.: US 7,668,079 B2
(45) Date of Patent: Feb. 23, 2010

(54) MULTIPLE ENDPOINT PATHS FOR POINT-TO-MULTIPOINT (P2MP) SPVC

(75) Inventors: Neeraj Chandra, Ottawa (CA); Adel Houssari, Kanata (CA); Benhong Li, Kanata (CA); Robert Steven Poitras, Woodlawn (CA)

(73) Assignee: Alcatel Lucent, Paris (FR)

( * ) Notice: Subject to any disclaimer, the term of this patent is extended or adjusted under 35 U.S.C. 154(b) by 552 days.

(21) Appl. No.: 11/255,713

(22) Filed: Oct. 21, 2005

(65) Prior Publication Data

US 2007/0091792 A1    Apr. 26, 2007

(51) Int. Cl.
*G01R 31/08* (2006.01)

(52) U.S. Cl. ........................................ 370/216

(58) Field of Classification Search .......... 370/216, 370/219, 217, 242, 218, 220, 221, 225, 226, 370/227, 228, 229, 230, 235, 237, 351, 241, 370/395.2
See application file for complete search history.

(56) References Cited

U.S. PATENT DOCUMENTS

| | | | | | |
|---|---|---|---|---|---|
| 5,841,976 | A | * | 11/1998 | Tai et al. | 709/204 |
| 5,930,238 | A | * | 7/1999 | Nguyen | 370/260 |
| 6,421,316 | B1 | * | 7/2002 | Masuo | 370/216 |
| 6,747,957 | B1 | * | 6/2004 | Pithawala et al. | 370/252 |
| 7,117,273 | B1 | * | 10/2006 | O'Toole et al. | 709/252 |
| 7,313,087 | B2 | * | 12/2007 | Patil et al. | 370/217 |
| 7,444,536 | B1 | * | 10/2008 | Jairath | 714/4 |
| 2004/0202112 | A1 | * | 10/2004 | McAllister et al. | 370/252 |

* cited by examiner

*Primary Examiner*—Kwang B Yao
*Assistant Examiner*—Anh Ngoc Nguyen
(74) *Attorney, Agent, or Firm*—Eckert Seamans Cherin & Mellott, LLC

(57) ABSTRACT

A method and system for implementing Multiple Endpoint Paths (MEP) for Point to Multipoint (P2MP) calls over Soft Permanent Virtual Connections (SPVC) are provided. When a condition is detected that requires a particular endpoint to be switched to an alternate endpoint, all calls of the P2MP group that used the particular endpoint are torn down in sequence, in accordance with SPVC procedures. Once all of the calls are torn down, any calls that are enabled for MEP are re-established using the alternate endpoint to replace the particular endpoint.

20 Claims, 4 Drawing Sheets

MULTIPLE ENDPOINT PATHS FOR POINT-TO-MULTIPOINT (P2MP) SPVC

FIELD OF THE INVENTION

The present invention relates to providing MEP (Multiple Endpoint Paths) for P2MP (Point-to-Multipoint) calls over SPVC (Soft Permanent Virtual Connection) communications.

BACKGROUND

PVC (Permanent Virtual Circuit) communications are set up in switched networks by a network manager. For PVC communications, the network manager determines a path for each call and configures each node along the path to set up all of the connections.

SPVC (Soft Permanent Virtual Connection) communications are also set up by a network manager. However, in this case, it is the nodes within the network that determine the path of a call rather than the network manager. There is more than one way to provision a SPVC call. In Dual Endpoint SPVC, the network manager configures both the source node and the destination node for a call. In Source Only SPVC, the network manager only configures the source node.

Multiple endpoint path (MEP) for providing endpoint redundancy for point-to-point communications is available for point-to-point PVC and SPVC communications. Selected calls on active end nodes in a digital communications network are configured by a network management system to have compatible alternate endpoint paths. When one of the selected active endpoint paths fails, the network management system automatically switches the endpath from the previously active endpoint to the alternate end point path. An example is disclosed in U.S. Pat. No. 6,498,779.

When an endpoint fails in a PVC call, in order to switch a call to an alternate endpoint, the network manager determines the new path, tears down only those connections not necessary in the new path, and establishes any new connections needed from the alternate endpoint to the old path. When an endpoint fails in a SPVC call, in order to switch to an alternate endpoint, the entire call must be torn down and re-established from the alternate endpoint. At the network element level, when a network element receives a message to tear down a particular call, it disconnects any connections on which the call to be torn down is the only call. Any shared connections remain connected in order to support the other calls going through those connections.

Point to Multipoint (P2MP) calls are typically used for broadcast video and long distance learning applications. A P2MP group is comprised of multiple calls from a root endpoint to multiple destinations (also referred to as leaf endpoints) in which the same data is sent. The calls all share the same resources until a point of divergence is reached. At points of divergence the data is sent to multiple leaf paths. P2MP is available for both PVC and SPVC. In PVC, P2MP calls can have MEP enabled.

SUMMARY OF THE INVENTION

In one aspect of the present invention, there is provided a method for establishing an alternate root endpoint to a root endpoint for one or more calls a point-to-multipoint (P2MP) group over a soft permanent virtual connection (SPVC), where the P2MP group comprises a plurality of calls from a root endpoint located on a root network element, each call ending at a different leaf endpoint, the method comprising: detecting a condition requiring calls starting at the root endpoint to be switched to the alternate root endpoint; causing the root network element to initiate disconnection of at least the calls of the P2MP group that have the alternate root endpoint specified; and causing a network element on which the alternate root endpoint is located to initiate re-establishment of at least one of the calls of the P2MP group that have the alternate root endpoint specified, using the alternate endpoint as a new root endpoint.

In another aspect, there is provided a method for establishing an alternate endpoint to a particular leaf endpoint for a point-to-multipoint (P2MP) call of a P2MP group over a soft permanent virtual connection (SPVC), where the P2MP group comprises a plurality of calls from a root endpoint located on a root network element, each call ending at a different leaf endpoint, the method comprising: detecting a condition that requires a call ending at the particular leaf endpoint to be switched to an alternate endpoint; causing the root network element to initiate disconnection of the call that ended at the particular leaf end point, wherein disconnection comprises disconnecting only those connections unique to the call that ended at the particular leaf endpoint; and causing the root network element to initiate re-establishment of the call, using the alternate endpoint as a new leaf endpoint. In another aspect, there is provided a method for establishing an alternate root endpoint for at least one call of a point-to-multipoint (P2MP) group of calls over a soft permanent virtual circuit (SPVCs) in a communication network comprised of a plurality of network elements, where the P2MP group comprises a plurality of calls from a root endpoint located on a root network element, each call ending at a different leaf endpoint, the method comprising: detecting a condition that requires a particular endpoint to be switched; causing the root network element to initiate the disconnection of any calls that have an alternate endpoint specified (e.g. in ATM node/shelf/slot/port/vpi/vci); and causing at least one of the calls that were disconnected to be re-established, using an alternate endpoint to replace the particular endpoint.

In another aspect, there is provided a computer readable medium having computer readable instructions stored thereon, that when executed by a computer, implement the method of either of the previous aspects.

In another aspect, there is provided a network manager configured to implement the method of either of the previous aspects.

In another aspect, there is provided a system for establishing an alternate endpoint for an endpoint for at least one call of a point-to-multipoint (P2MP) group over a soft permanent virtual circuit (SPVC), where the P2MP group comprises a plurality of calls from a root endpoint located on a root network element, each call ending at a different leaf endpoint, the system comprising: a detector for detecting a condition that requires calls to or from a particular endpoint to be switched; a first interface for causing the root network element to initiate disconnection of all connections unique to any call having an alternate to the particular end point specified; and a second interface for causing at least one call of the calls that were disconnected to be re-established, using the alternate endpoint to replace the particular endpoint, by instructing a network element from which the at least one call is to start to connect the at least one call.

Other aspects and features of the present invention will become apparent, to those ordinarily skilled in the art, upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION

Embodiments of the present invention provide MEPs at root endpoints and at leaf endpoints for SPVC P2MP calls.

Figure 1:
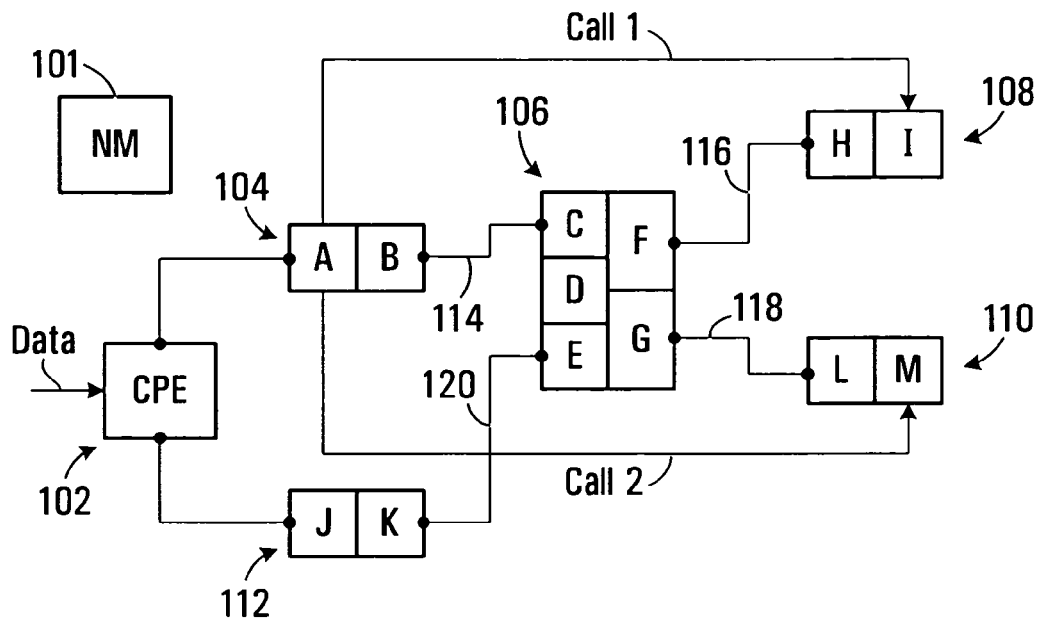
FIG. 1 is a block diagram of a SPVC P2MP group of calls with MEP enabled on a root endpoint in accordance with one embodiment of the present invention.

FIG. 1 is a block diagram of a SPVC P2MP group comprised of two calls—Call #1 Call #2, in accordance with one embodiment of the present invention. Each P2MP call in this embodiment is enabled for MEP at the root endpoint A.

The P2MP group is managed by a network manager 101, which interfaces with the network elements in the SPVC network (the interfaces with the network elements are not shown in FIG. 1). The network manager 101 configures that root network element 104 to set up the calls of the P2MP group.

If the network manager 101 detects a condition that requires the calls to be switched to an alternate endpoint, it initiates a tear down of the calls by sending a message to the root network element to tear down the calls. Then the network manager 101 initiates a re-establishment of at least one of the calls using the alternate root endpoint J as the root endpoint. In some embodiments, only calls that are MEP enabled are torn down and re-established. In some embodiments, all of the calls of the P2MP group are torn down but only those calls that are MEP enabled are re-established. In other embodiments, all of the calls of the P2MP group are re-established.

Customer premise equipment (CPE) 102 communicates with endpoint A and with alternate endpoint J. Data for the P2MP call goes through the CPE 102 to whichever of the two endpoints A and J is active. In some embodiments data is being simultaneously being transmitted to endpoints A and J.

In the embodiment of FIG. 1, communication element A, the root endpoint for the P2MP call, is located on a network element 104 along with communication element B. Communication element B is connected to communication element C, which is located on network element 106, via link 114. Network element 106 also comprises communication elements D, E, F and G. Communication element J is located on network element 112 along with communication element K. Communication element K is connected to communication element E on network element 106 via link 120. Communication element F, on network element 106, is connected via link 116 to communication element H on network element 108, which also comprises communication element I. On network element 106, communication element G is connected via link 118 to communication element L on network element 110, which also comprises communication element M. The links between network elements may be cables or wireless connections in some embodiments. The links may connect to the network elements at ports in some embodiments. In some embodiments, the connections within a network element are known as cross-connects.

To set up the two calls of the P2MP group, the network manager sends two messages to network element 104, one to establish a call from communication element A to communication element I and the second to establish a call from communication element A to communication element M. The calls are then setup by the network elements in accordance with SPVC protocol. Call #1 from communication elements A to I follows a path along communication elements A, B, C, F, H and I. Call #2 follows a path along communication elements A, B, C, G, L and M. As can be seen, the calls share network resources A, B, and C. After that the calls diverge into two paths, with leaf endpoints I and M.

The SPVC P2MP group of calls described above is one embodiment of the present invention. It is to be understood that a P2MP group can be comprised of any number of calls and is not limited to two calls as depicted in FIG. 1. As well, MEP can be enabled on more than one endpoint in a network and is not limited to root endpoints. The network depicted in FIG. 1 has four network elements or nodes. Any number of network elements can make up the SPVC network. While the alternate root endpoint J is on a separate network element 112 from the primary root endpoint A in this embodiment, it is possible for alternate endpoints to be on the same network element as their respective primary endpoints.

Figure 2:
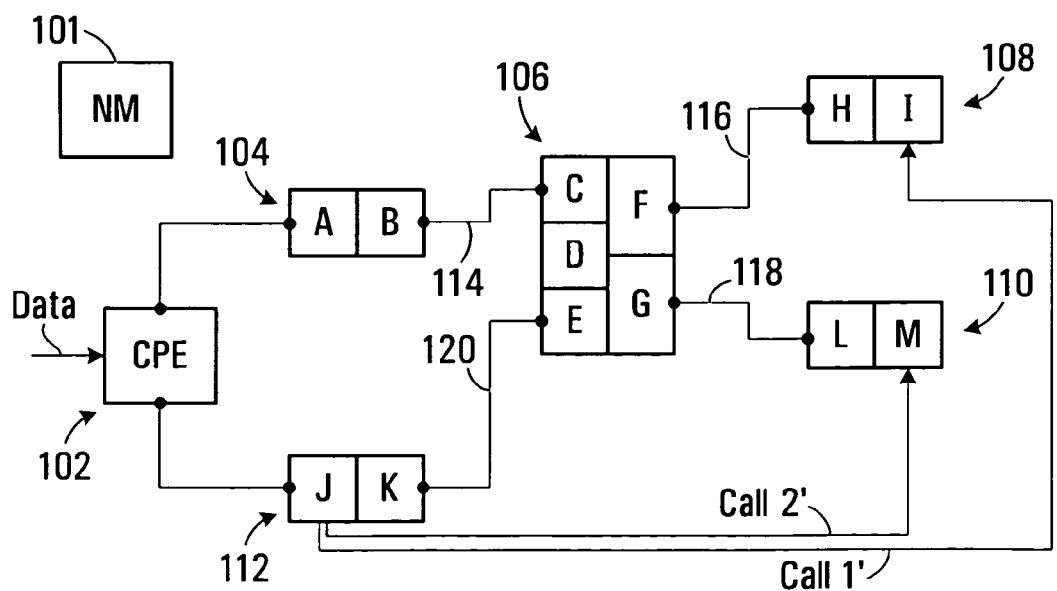
FIG. 2 is a block diagram of the SPVC P2MP group of calls depicted in FIG. 1 using the alternate root endpoint.

FIG. 2 is a block diagram of the P2MP group described above with reference to FIG. 1, after a condition is detected requiring a switch from communication element A to an alternate endpoint. For example, a failure at endpoint A or a diagnostic operation such as a forced switch. If communication element A fails, the CPE 102 detects the failure and sends the data for the P2MP group to communication element J. Network manager 101 also detects the failure and causes call #1 and call #2 to be torn down. This is done by sending two messages to network element 104. The first message is to tear down call #1 and the second message is to tear down call #2. Starting from network element 104, the network elements along the path of call #1 disconnect all connections not shared with call #2, i.e. the connections between communication elements C and F, and H and I. Then call #2 is disconnected. Because it is the last call remaining, all of its connections are disconnected. In dual endpoint SPVC's disconnection messages are sent to both the source and destination nodes. The network manager 101 also sends setup messages to network element 112 to re-establish the calls from endpoint J to I and J to M. In some situations, all of the calls must be torn down before re-establishing the calls using the alternate root endpoint in order to free up the network resources for the P2MP group from the new root endpoint. The calls are torn down one at a time, with shared connections staying connected until all of the calls going through them have been torn down.

In some embodiments, only some of the calls of the P2MP group are enabled for MEP. In those cases, only the calls that are MEP enabled will be torn down and re-established by the network manager 101. In other embodiments, the root endpoint is being protected by more than one alternate endpoint. In this case, when the root endpoint fails, some calls are re-established on one alternate endpoint and other calls are re-established on one or more other alternate endpoint(s). Any number of alternate endpoints is contemplated by embodiments of the present invention. In still other embodiments, two or more active endpoints can act as alternates for each other. In this case, a portion of the calls of the P2MP group is sent to each active endpoint. If a condition that requires the calls of one active endpoint to be switched is detected, those calls are torn down and re-established from one of the alternate endpoints.

Figure 3:
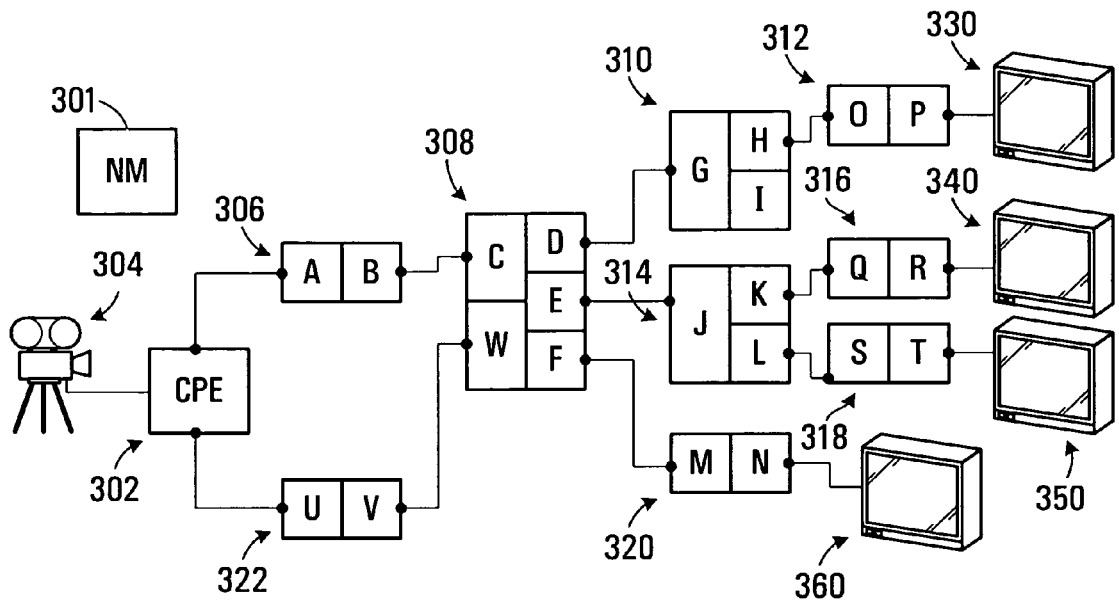
FIG. 3 is a block diagram of a system set up for SPVC P2MP with MEP at the root endpoint in accordance with an embodiment of the present invention.

FIG. 3 is a block diagram of a SPVC P2MP group with MEP enabled in accordance with an embodiment of the present invention. In this embodiment, the data for the P2MP group is provided from a camera 304 and flows through CPE 302. The CPE 302 is in communication with communication element A on network element 306 and communication element U on network element 322. Communication element U is the alternate endpoint for communication element A. Network element 306 is comprised of communication elements A and B, with communication element B connected to communication element C on network element 308. Network element 322 is comprised of communication elements U and V, with communication element V connected to communication element W on network element 308. Network element 308 is comprised of communication elements C, D, E, F and W. Communication element D is connected to communication element G on network element 310, communication element E is connected to communication element J on network element 314, and communication element F is connected to communication element M on network element 320. Network element 310 is comprised of communication elements G, H, and I. Communication element H is connected to communication element O on network element 312 and communication element I is not connected to any other network element. Network element 312 comprises communication elements O and P and communication element P is connected to a receiving device 330. Network element 314 is comprised of communication elements J, K, and L. Communication element K is connected to communication element Q on network element 316 and communication element L is connected to communication element S on network element 318. Network element 316 is comprised of communication elements Q and R, and network element 318 is comprised of communication elements S and T. Communication element R is connected to receiving device 340. Communication element T is connected to receiving device 350. Network element 320 is comprised of communication elements M and N and communication element N is connected to receiving device 360.

In operation, a network manager 301 sets up a SPVC P2MP group by sending messages to network element 306 to establish calls from A to P, A to R, A to T and A to N. The call from A to P is connected along path A-B-C-D-G-H-O-P by the network elements along that path. The call from A to R is connected along path A-B-C-E-J-K-Q-R by the network elements along the path. The call from A to T is connected along path A-B-C-E-J-L-S-T by the network elements along that path. The call from A to N is connected along path A-B-C-F-M-N by the network elements along that path. Once the calls are connected, data can flow from the camera 304 through the CPE 302 and to receiving devices 330, 340, 350, and 360. Receiving devices 330, 340, 350 and 360 are any device configured to receive the data of the P2MP group. Examples are video devices, audio devices, televisions, monitors, etc.

If root endpoint A fails, the CPE directs the data from camera 304 to alternate endpoint U. The network manager 301 causes all of the calls making up the P2MP group to be torn down. The network manager 301 also sends messages to network element 322 with instructions to re-establish any of the calls for which MEP is enabled using endpoint U as the root endpoint for the calls. For example, if the call to receiving device 330 is MEP enabled, the network manager will send a message to network element 322 to establish a call from communication element U to communication element P. The call will be connected along path U-V-W-D-G-H-O-P by the network elements along that path.

Figure 4:
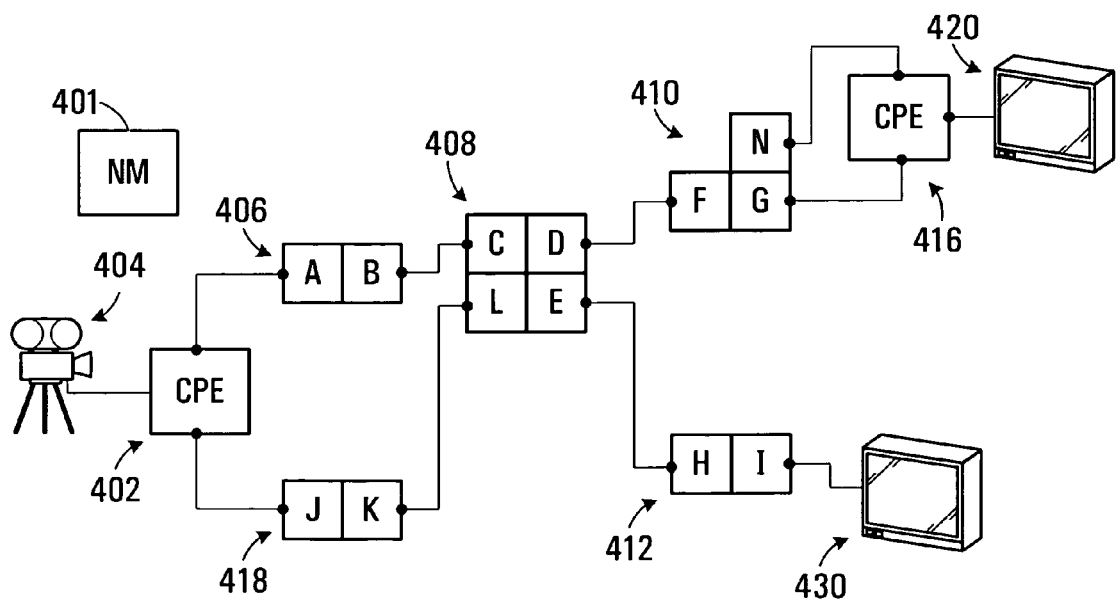
FIG. 4 is a block diagram of a system set up for SPVC P2MP with MEPs at the root endpoint and at least one leaf endpoint in accordance with an embodiment of the present invention.

FIG. 4 is a block diagram of a SPVC P2MP group of calls configured for MEP at the root endpoint and one of the leaf endpoints. In this embodiment, the data for the P2MP group is provided from a camera 404 and flows through CPE 402. The CPE 402 is in communication with communication element A on network element 406 and communication element J on network element 418. Communication element J is the alternate endpoint for communication element A. Network element 406 is comprised of communication elements A and B, with communication element B connected to communication element C on network element 408. Network element 418 is comprised of communication elements J and K with communication element K connected to communication element L on network element 408. Network element 408 is comprised of communication elements C, L, D and E. Communication element D is connected to communication element F on network element 410 and communication element E is connected to communication element H on network element 412. Network element 412 is comprised of communication elements H and I, with communication element I connected to receiving device 430. Network element 410 is comprised of communication elements F, G and N. Communication elements N and G are in communication with CPE 416, thus providing MEP for receiving device 420, which is also in communication with the CPE 416.

In the embodiment described with reference to FIG. 4, alternate endpoints N and G are on the same network element 410. However, alternate endpoints may be on separate network elements. Once the call that fails is torn down, it can be re-established using any alternate endpoint, regardless of location. In some embodiments, more than one leaf endpoint share the same alternate endpoint. Given the low risk of more than one leaf endpoint failing at the same time, this is a cost efficient manner of providing alternate leaf endpoints.

In operation, if a SPVC P2MP group of calls is set up comprising calls from A to G and A to I, the call will not fail if endpoints A or G fails. If endpoint A fails, the network manager 401 causes the two calls to be torn down and re-establishes the calls from endpoint J. CPE 402 transfers the data from camera 404 to endpoint J. If endpoint G fails, the network manager 401 causes the call from A to G to be torn down and sends a message to network element 406 to establish a call from A to N. The data now reaches receiving device 420 through endpoint N and CPE 416.

As mentioned above, in SPVC, when one call of a P2MP group is torn down, the network elements disconnect only those connections that are supporting only that call to be torn down. Therefore, the shared connections stay connected. For example, in the embodiment of FIG. 4, to tear down the call from A to G, the connections from communication element C to communication element D and from communication element F to communication element G are disconnected. However, the connection between communication elements A and B stays connected. Network element 406 knows that this connection is supporting another call and that it should not be disconnected.

Figure 5:
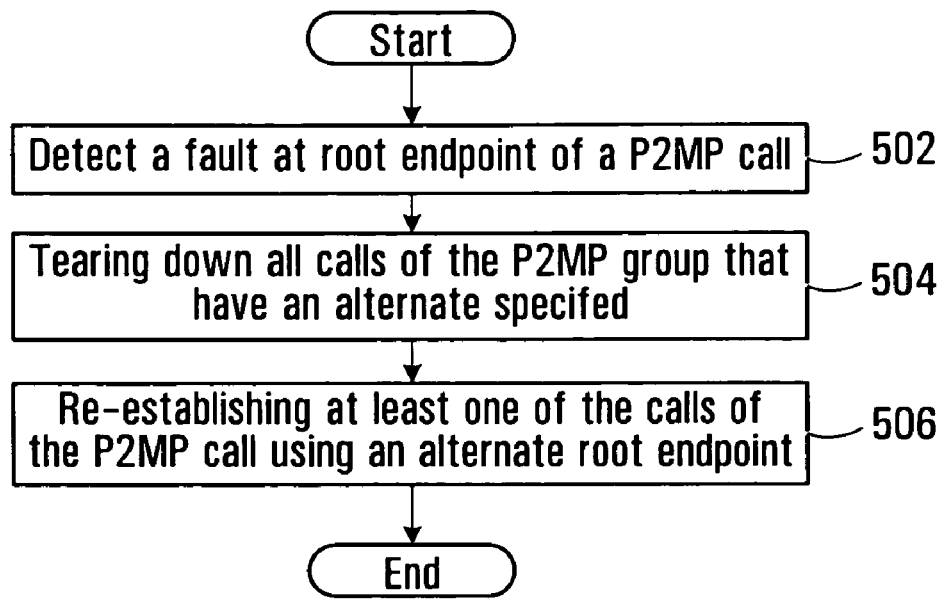
FIG. 5 is a flowchart of a method of establishing an alternate endpoint path for a root endpoint of a SPVC P2MP group of calls.

FIG. 5 is a flowchart of a method of transferring to an alternate root endpoint in accordance with an embodiment of the present invention. In step 502 a condition is detected requiring a root endpoint of a SPVC P2MP group, such as communication element A in FIGS. 1 to 4, to be switched to an alternate. In step 504, all of the calls that make up the SPVC P2MP group that have an alternate specified are torn down. In some embodiments, this is done by a network manager sending a tear down message for each call to the network element on which the root endpoint resides. In other embodiments, a single bulk operation message to tear down all the calls in a P2MP group can be sent to the network element. Some embodiments comprise tearing down all of the calls of the P2MP group. In some embodiments, the tear down and setup operations are done on a per P2MP call basis or in other words, the disconnection and re-establishment of the calls are interleaved. The network elements along each path disconnect the call. In step 506, at least one of the calls that made up the SPVC P2MP group is re-established using an alternate root endpoint. In some embodiments, this last step is accomplished by a network manager sending a setup message to a network element on which the alternate endpoint resides.

In some embodiments, the calls are re-established in a sequence based on predetermined priority. In other embodiments, the calls are re-established based on available connectivity.

In some embodiments, the method described with reference to FIG. 5 also comprises transferring the data being communicated in the P2MP group to the alternate endpoint. In some embodiments, the data is transferred from the primary root endpoint to the alternate root endpoint by a CPE. In some embodiments, the data is simultaneously sent to both the primary and alternate endpoints.

Figure 6:
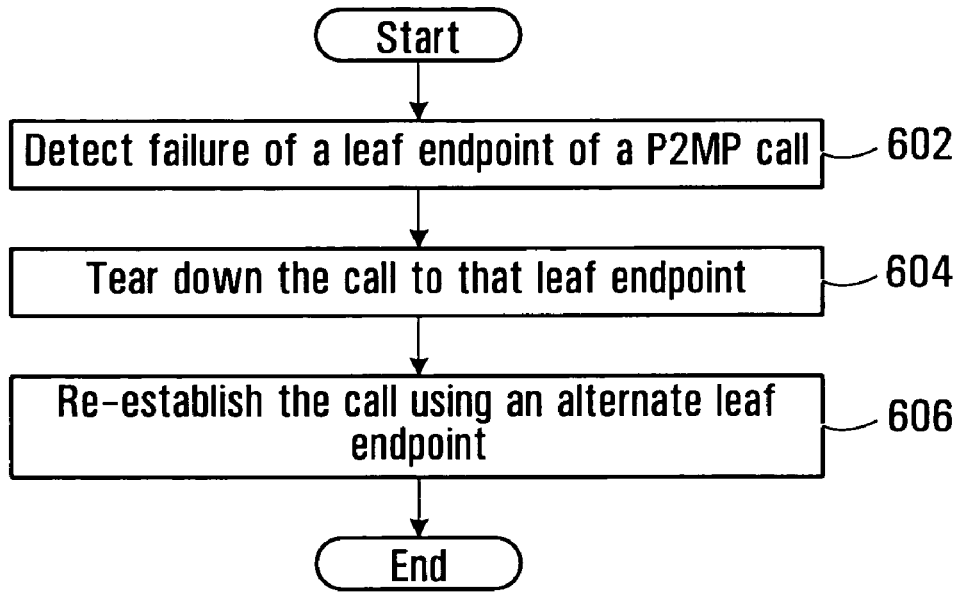
FIG. 6 is a flowchart of a method of establishing an alternate endpoint path for a leaf endpoint of a SPVC P2MP group.

FIG. 6 is a flowchart of a method of establishing an alternate leaf endpoint for a call of a SPVC P2MP group. In step 602, a failure of a leaf endpoint is detected. At step 604, the call to that leaf endpoint is torn down. In some embodiments, this is achieved by a network manager sending a message to the root endpoint for the P2MP call to tear down the call to the leaf endpoint that failed. In SPVC, only those connections that are not common to other calls are disconnected by the network elements along the path of the failed call. Once the failed call is torn down, the call is re-established to an alternate leaf endpoint (Step 606). The re-establishment is achieved by sending a message to the root network element to establish a call from the root endpoint to the alternate leaf endpoint.

In some embodiments of the present invention, the method steps of the methods described above are implemented by a network manager. In some cases, the network manager comprises software for implementing the method steps. In other cases, the steps are implemented by hardware and in other cases, they are implemented by a combination of hardware and software. In some embodiments, some of the method steps are implemented by a network element, such as a node.

Figure 7:
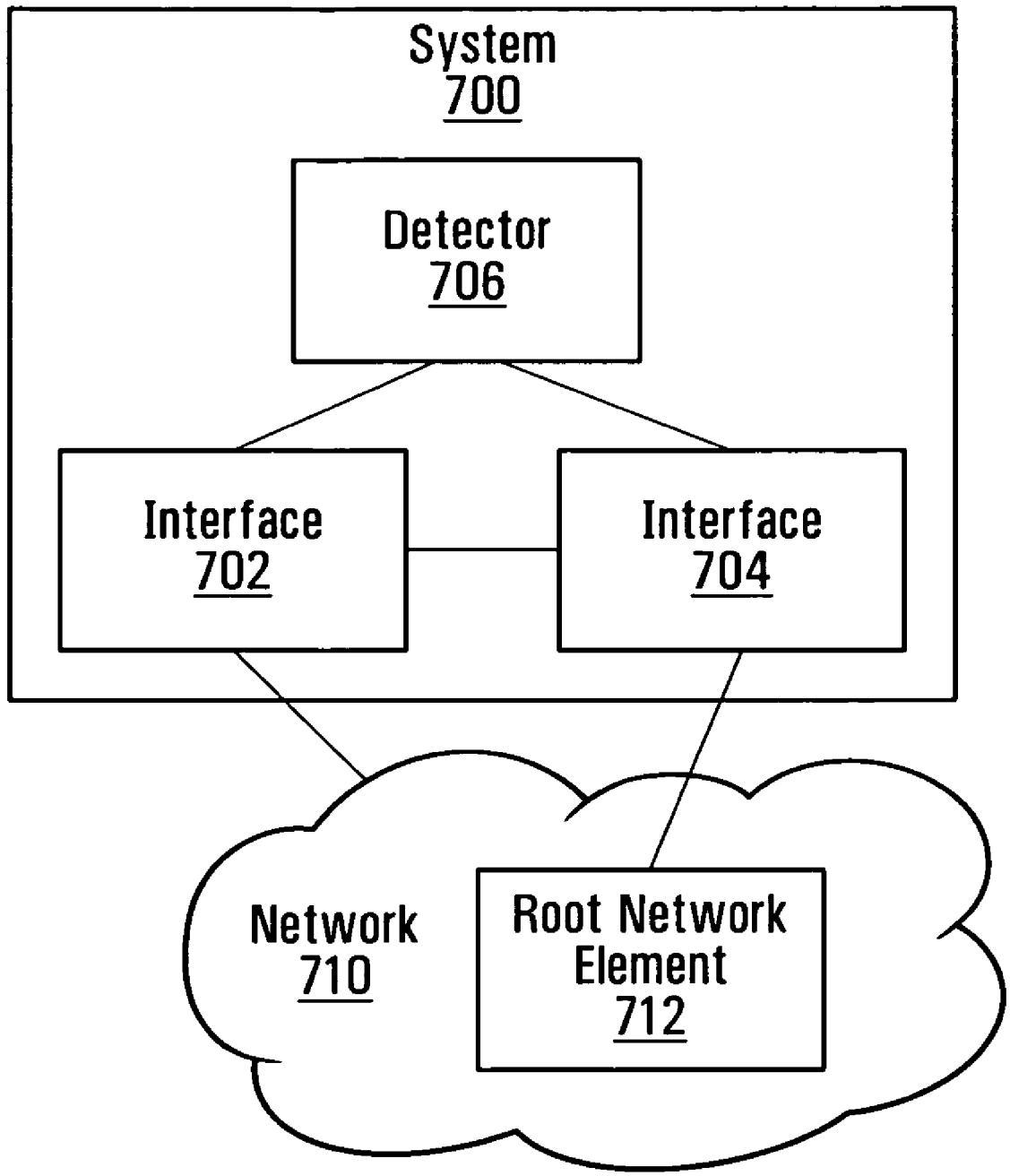
FIG. 7 is a block diagram of a network manager in accordance with one embodiment of the present invention.

FIG. 7 is a block diagram of a system 700 in accordance with an embodiment of the present invention. The system 700 is for establishing an alternate endpoint for an endpoint for at least one call of a P2MP group over a SPVC in a communication network. System 700 comprises an interface 704 to a root network element, an interface 702 to the communication network, and a detector 706. Although FIG. 7 depicts all of the components of the system in one box, the components are not necessarily co-located. In some embodiments, the components are located on a network manager, on nodes, or combinations of nodes and a network manager.

The detector 706 detects conditions that require a particular endpoint of the P2MP group to be switched to an alternate endpoint. The detector may detect the condition by querying network elements within the network, or by receiving an error message from a network element. In some cases, one or more network elements within the network sends messages indicating that communication elements on the respective network elements are operating properly. In this case, failure to receive such a message with respect to an endpoint is a condition requiring a switch.

Once the detector detects a condition requiring a switch, it notifies the interface 702 which then causes root network element 712 to initiate the tear down of any calls of the P2MP group having the particular endpoint as an endpoint. If the particular endpoint is the root endpoint of the P2MP group of calls, then at least the calls that are MEP enabled are torn down in the manner described above with reference to FIG. 2. If the particular endpoint is a leaf endpoint, only the call ending at that endpoint is torn down.

Next interface 702 causes at least one of the calls torn down to be re-established after the tear down is completed. In cases where the root endpoint is to be switched, this involves sending a message to the network element on which the alternate endpoint is located to initiate the re-establishment of the calls. In cases where a leaf endpoint is to be switched, the message is sent to the root network element.

Embodiments of the present invention are implemented using hardware, software or combinations thereof. In some embodiments, the methods disclosed are implemented on a computer that executes computer implemented instructions stored on a computer readable medium. In some embodiments, the network manager 101, 301, or 401 is Alcatel's 5620. Examples of network elements are Alcatel nodes 7670 RSP, 7470, 7270 and 7670 ESE.

In the embodiments described above, the endpoints are physical endpoints located within one network. In other embodiments, a call may traverse more than one network. The point where such a call starts or ends in a foreign (or external) network is called a logical endpoint. Embodiments of the present invention provide MEP for logical endpoints as well as physical endpoints.

What has been described is merely illustrative of the application of the principles of the invention. Other arrangements and methods can be implemented by those skilled in the art without departing from the spirit and scope of the present invention.

The invention claimed is:

1. A method, in a network manager, for establishing an alternate root endpoint to a root endpoint for one or more calls of a point-to-multipoint (P2MP) group over a soft permanent virtual connection (SPVC), where the P2MP group comprises a plurality of calls from a root endpoint located on a root network element, each call ending at a different leaf endpoint, the method comprising:

the network manager detecting a condition requiring calls starting at the root endpoint to be switched to the alternate root endpoint;

the network manager causing the root network element to initiate disconnection of at least the calls of the P2MP group that have the alternate root endpoint specified wherein disconnection of a call comprises disconnecting all those connections unique to the call; and the network manager causing a network element on which the alternate root endpoint is located to initiate re-establishment of at least one of the calls of the P2MP group that have the alternate root endpoint specified, using the alternate endpoint as a new root endpoint.

2. The method of claim 1, wherein causing the root network element to initiate disconnection further comprises causing the root network element to initiate disconnection of all of the calls of the P2MP group.

3. The method of claim 1, wherein a specific call can only be re-established from the alternate root endpoint after the disconnection of the specific call from the root endpoint has been completed.

4. The method of claim 1, wherein more than one alternate endpoint is provided, each alternate endpoint supporting a number of the calls of the P2MP group.

5. The method of claim 1, further comprising selecting which calls are to be re-established.

6. The method of claim 5, wherein the calls to be re-established are selected based on at least one of priority and available connectivity.

7. The method of claim 1, wherein at least two active root endpoints are alternate endpoints for each other.

8. The method of claim 1, wherein at least two root endpoints have the same alternate root endpoint.

9. The method of claim 1, wherein each call comprises an indicator of whether or not it is to be re-established if a condition requiring the call to be switched to an alternate endpoint is detected.

10. The method of claim 1, wherein the disconnection and re-establishment of calls on the alternate root endpoint is interleaved on a per call basis.

11. A tangible computer readable medium having computer readable instructions stored thereon, that when executed by a computer, implement the method of claim 1.

12. The network manager configured to implement the method of claim 1.

13. A method, in a network manager, for establishing an alternate endpoint to a particular leaf endpoint for a point-to-multipoint (P2MP) call of a P2MP group over a soft permanent virtual connection (SPVC), where the P2MP group comprises a plurality of calls from a root endpoint located on a root network element, each call ending at a different leaf endpoint, the method comprising:

the network manager detecting a condition that requires a call ending at the particular leaf endpoint to be switched to an alternate endpoint;

the network manager causing the root network element to initiate disconnection of the call that ended at the particular leaf end point, wherein disconnection comprises disconnecting all those connections unique to the call that ended at the particular leaf endpoint; and the network manager causing the root network element to initiate re-establishment of the call, using the alternate endpoint as a new leaf endpoint.

14. The method of claim 13, wherein at least two leaf endpoints have the same alternate endpoint.

15. A tangible computer readable medium having computer readable instructions stored thereon, that when executed by a computer, implement the method of claim 13.

16. The network manager configured to implement the method of claim 13.

17. A system for establishing an alternate endpoint for an endpoint for at least one call of a point-to-multipoint (P2MP) group over a soft permanent virtual circuit (SPVC), where the P2MP group comprises a plurality of calls from a root endpoint located on a root network element, each call ending at a different leaf endpoint, the system comprising:

a detector for detecting a condition that requires calls to or from a particular endpoint to be switched;

a first interface for causing the root network element to initiate disconnection of all connections unique to any call having an alternate to the particular end point specified; and a second interface for causing at least one call of the calls that were disconnected to be re-established, using the alternate endpoint to replace the particular endpoint, by instructing a network element from which the at least one call is to start to connect the at least one call.

18. The system according to claim 17, further comprising a storage means for storing call information for the calls of the P2MP group.

19. The system according to claim 17, wherein the detector detects the condition by querying a network element.

20. The system according to claim 17, wherein the detector detects the condition by receiving an error message from a network element.

* * * * *

UNITED STATES PATENT AND TRADEMARK OFFICE
CERTIFICATE OF CORRECTION

PATENT NO. : 7,668,079 B2  Page 1 of 1
APPLICATION NO. : 11/255713
DATED : February 23, 2010
INVENTOR(S) : Chandra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twenty-eighth Day of December, 2010

David J. Kappos
*Director of the United States Patent and Trademark Office*